(12) United States Patent
Topkins et al.

(10) Patent No.: US 10,201,754 B1
(45) Date of Patent: Feb. 12, 2019

(54) SYSTEMS AND METHODS FOR INCENTIVIZING USER LOG-IN TO A USER ACCOUNT ASSOCIATED WITH AN ONLINE GAME

(71) Applicant: Electronic Arts Inc., Redwood City, CA (US)

(72) Inventors: Benjamin Topkins, Castro Valley, CA (US); Gaoqi Zheng, Beijing (CN); Devin Nambiar, Hayward, CA (US)

(73) Assignee: ELECTRONIC ARTS INC., Redwood, CA (US)

( * ) Notice: Subject to any disclaimer, the term of this patent is extended or adjusted under 35 U.S.C. 154(b) by 0 days.

(21) Appl. No.: 15/727,496

(22) Filed: Oct. 6, 2017

Related U.S. Application Data

(63) Continuation of application No. 14/677,949, filed on Apr. 2, 2015, now Pat. No. 9,782,677.

(51) Int. Cl.
*A63F 13/45* (2014.01)
*A63F 13/35* (2014.01)
*A63F 13/69* (2014.01)
*A63F 13/825* (2014.01)
*A63F 13/44* (2014.01)
(Continued)

(52) U.S. Cl.
CPC .............. *A63F 13/45* (2014.09); *A63F 13/35* (2014.09); *A63F 13/44* (2014.09); *A63F 13/537* (2014.09); *A63F 13/69* (2014.09); *A63F 13/825* (2014.09); *G06Q 30/0209* (2013.01); *G07F 17/326* (2013.01); *G07F 17/3255* (2013.01); *G07F 17/3262* (2013.01); *A63F 2250/22* (2013.01); *A63F 2300/305* (2013.01); *A63F 2300/5506* (2013.01); *A63F 2300/5546* (2013.01); *A63F 2300/575* (2013.01); *A63F 2300/63* (2013.01); *A63F 2300/636* (2013.01); *A63F 2300/638* (2013.01); *A63F 2300/65* (2013.01); *A63F 2300/807* (2013.01)

(58) Field of Classification Search
None
See application file for complete search history.

(56) References Cited

U.S. PATENT DOCUMENTS 5,649,862 A 7/1997 Sakaguchi
5,781,894 A 7/1998 Petrecca
(Continued)

OTHER PUBLICATIONS

GOW_levelup.pdf, Machine Zone, Jan. 1, 2014, at http://appheroics.com/gameofwarlevelup, pp. 1-4.
(Continued)

*Primary Examiner* — Jason Yen
(74) *Attorney, Agent, or Firm* — Knobbe, Martens, Olson & Bear, LLP (57) ABSTRACT

User log-in to a user account of an online game may be incentivized by providing awards to the users for logging in. Reengagement time periods for individual ones of the user accounts may be determined. The reengagement time periods may be determined to expire at times when a user may be logged out and/or may be expected to be logged out. By way of non-limiting example, the reengagement time periods may expire during wait periods for ongoing in-game tasks. The awards may be provided based on the expiration of the reengagement time periods and the user accounts conveying satisfaction of award redemption criteria.

20 Claims, 4 Drawing Sheets

(51) Int. Cl.
*A63F 13/537* (2014.01)
*G07F 17/32* (2006.01)
*G06Q 30/02* (2012.01)

(56) References Cited

U.S. PATENT DOCUMENTS

| | | | |
|---|---|---|---|
| 6,196,920 B1 | 3/2001 | Spaur | |
| 6,615,175 B1 | 9/2003 | Gazdzinski | |
| 6,616,533 B1 | 9/2003 | Rashkovskiy | |
| 6,709,335 B2 | 3/2004 | Bates | |
| 7,729,946 B2 | 6/2010 | Chu | |
| 8,107,940 B1 | 1/2012 | Jackson | |
| 8,360,873 B1 | 1/2013 | Wickett | |
| 8,449,385 B2 | 5/2013 | Mosites | |
| 8,814,662 B1 | 8/2014 | Lall | |
| 9,463,386 B1* | 10/2016 | Chapman | A63F 13/60 |
| 2003/0060247 A1 | 3/2003 | Goldberg | |
| 2004/0148221 A1 | 7/2004 | Chu | |
| 2006/0135232 A1 | 6/2006 | Willis | |
| 2007/0265046 A1 | 11/2007 | Sato | |
| 2009/0258687 A1 | 10/2009 | Weichselbaum | |
| 2009/0313117 A1 | 12/2009 | Hu | |
| 2011/0161790 A1 | 6/2011 | Junior | |
| 2011/0207529 A1 | 8/2011 | Acres | |
| 2012/0122587 A1* | 5/2012 | Kelly | A63F 13/85 3/85 |
| 2012/0208642 A1* | 8/2012 | Borst | A63F 13/795 3/795 |
| 2012/0214600 A1* | 8/2012 | Mosley | G07F 17/3262 463/42 |
| 2012/0244945 A1 | 9/2012 | Kolo | |
| 2012/0289316 A1 | 11/2012 | Luchene | |
| 2012/0290409 A1 | 11/2012 | Pradeep | |
| 2012/0315993 A1 | 12/2012 | Dumont | |
| 2013/0005438 A1* | 1/2013 | Ocko | H04W 4/21 463/25 |
| 2013/0014182 A1 | 1/2013 | Nussel | |
| 2013/0217489 A1 | 8/2013 | Bronstein Bendayan | |
| 2013/0288757 A1* | 10/2013 | Guthridge | A63F 13/12 463/2 |
| 2014/0214506 A1 | 7/2014 | VanLuchene | |
| 2014/0249926 A1 | 9/2014 | Wallace | |
| 2014/0274409 A1* | 9/2014 | Tinsman | G07F 17/3274 463/42 |
| 2015/0094150 A1* | 4/2015 | Gregory | A63F 13/12 463/42 |

OTHER PUBLICATIONS

Leviathyn I Thirst of Night Review—Leviathyn [Retrieved online on Feb. 4, 2014] URL http://leviathyn.com/pc/2012/05/18/review-thirst-of-night-2/, 3 pages.

Speedups.JPG [Retrieved online Feb. 4, 2014] URL Supportkq.playdemic.com/Faq/?cat=General, 1 page.

Video Button to Earn Speedups . . . -Game Support by Players for Players . . . [Retrieved online on Feb. 4, 2014] URL http://forums.playdemic.com/index.php?/topic/11666-video-button-to-earn-speedups/, 3 pages.

* cited by examiner

SYSTEMS AND METHODS FOR INCENTIVIZING USER LOG-IN TO A USER ACCOUNT ASSOCIATED WITH AN ONLINE GAME

FIELD OF THE DISCLOSURE

This disclosure relates to incentivizing user log-in to a user account associated with an online game.

BACKGROUND

Users may access virtual spaces via computing platforms. A virtual space may include one or more online games taking place within the virtual space. Users may participate in an online game in a variety of ways. Participation may include effectuating timed in-game tasks. Timed in-game tasks may correspond to building virtual objects, harvesting virtual resources, training virtual troops, battling other users and/or non-player characters, and/or other timed in-game tasks. Timed in-game tasks may be associated with wait periods. A user may have to wait for an expiration of a wait period before they can redeem a corresponding reward associated with a completion of the task. A user may log out of their user account associated with the online game during a wait period.

SUMMARY

One aspect of the disclosure relates to a system for incentivizing user log-in to a user account associated with an online game. In some implementations, a reengagement time period associated with an award may be determined. A reengagement time period may be determined to expire prior to an expiration of a timed in-game task. A user's account may be provided an award based on the expiration of a reengagement time period and the user account conveying that award redemption criteria has been satisfied. Redemption criteria may include, for example, the user account conveying that the user has logged in to the user account before, during, and/or after the expiration of the reengagement time period.

In some implementations, the system may comprise one or more physical processors configured to execute machine-readable instructions. The machine-readable instructions may include one or more of a user component, a space component, an engagement component, an award component, a redemption component, and/or other components.

The user component may be configured to manage user accounts associated with users of an online game. The user accounts may reflect log-in histories of the user accounts, and/or other information. The user accounts may include a first user account associated with a first user and/or other users, and/or other user accounts.

The space component may be configured to execute an instance of the online game and implement the instance of the online game to facilitate user participation in the online game. The online game may take place in a virtual space. User participation may include effectuating one or more timed in-game tasks associated with wait periods, and/or other activities. A timed in-game task may be effectuated through initiation of the timed in-game task via user input and/or other input. The timed in-game tasks may be completed at the end of the wait period without further user input. By way of non-limiting example, a first timed in-game task may be initiated in response to user input associated with a first user account. The initiation of the first timed in-game task may begin a first wait period. The first timed in-game task may be completed at the end of the first wait period without further user input associated with the first user account.

The engagement component may be configured to determine reengagement time periods for individual ones of the user accounts. The reengagement time periods may be determined to expire at times other than the expirations of present wait periods for ongoing in-game tasks associated with the individual user account. By way of non-limiting example, a first reengagement time period may be determined for the first user account based on one or more present wait periods for one or more ongoing in-game tasks associated with the first user account. By way of non-limiting example, the first reengagement time period may be determined to expire at a time other than the expirations of the one or more ongoing in-game tasks associated with the first user account.

The award component may be configured to associate one or more awards with the expirations of the reengagement time periods. By way of non-limiting example, a first award and/or other awards may be associated with the expiration of the first reengagement time period.

The redemption component may be configured to provide the one or more awards to the user accounts based on the expiration of the reengagement time periods and the user accounts conveying satisfaction of award redemption criteria. By way of non-limiting example, the first award may be provided to the first user account based on the expiration of the first reengagement time period and a determination that the first user account conveys satisfaction of first redemption criteria.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
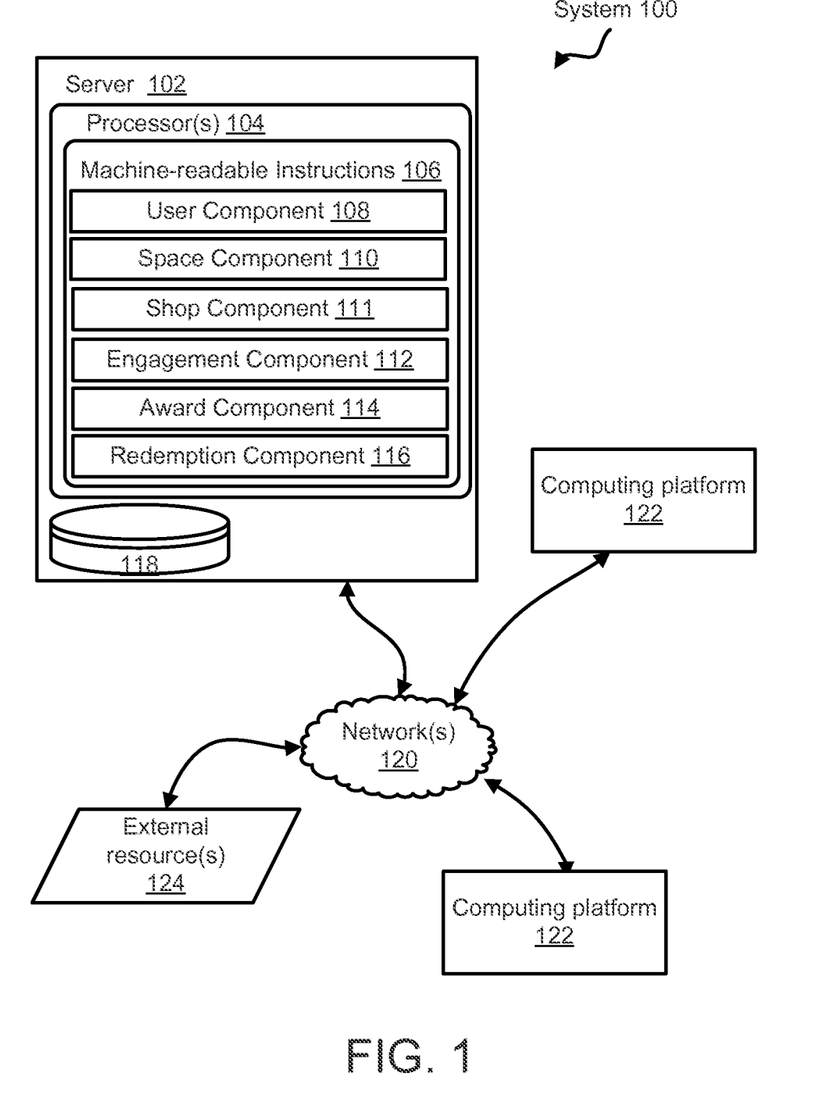
FIG. 1 illustrates a system for incentivizing user log-in to a user account associated with an online game, in accordance with one or more implementations.

FIG. 1 illustrates a system 100 for incentivizing log-in to a user account associated with an online game, in accordance with one or more implementations. The online game may take place within a virtual space. User participation in the online game may include effectuating one or more timed in-game tasks, and/or other participation activities.

Virtual objects may include virtual items and/or goods. Virtual items and/or goods may include one or more of a virtual weapon, a tool, a virtual resource (e.g., a food, a currency, health, a potion, a power up, and/or other resource), a reward, a bonus, an enhancement, a mount, a speed-up, clothing, a vehicle, an anatomical feature of a game entity, a troop or troop type, a pet, and/or other virtual items and/or goods. Game entities may include one or more of a virtual character, group of characters, a virtual object, a battalion, a clan, a unit, a village, an army, a troop, and/or other entity.

Virtual items may be associated with and/or included in virtual inventories associated with the user accounts. The virtual inventors may be virtual objects displayed in the online game that may appear to "fill up" as virtual items are included. In some implementations, a virtual inventory may include a list that may be accessible to a user via a menu and/or window that describes the virtual items included in the virtual inventory.

Timed in-game tasks may be associated with wait periods. By way of non-limiting example, a timed in-game task may be initiated in response to user input via a computing platform. The initiation may start a countdown of an associated wait period. In some implementations, wait periods may be predetermined (e.g., based on a user accounts status, level, XP, and/or other criteria), user determined, and/or determined in other ways. In some implementations, wait periods may be based on real-world time and/or virtual time (e.g., may be faster or slower than real-world time).

Timed in-game tasks may be associated with awards. Awards may include virtual items and/or other awards. An expiration of a wait period may result in one or more virtual items being included in a virtual inventory of a user account, one or more virtual items already associated with a user account being replenished within a virtual inventory, one or more virtual items being changed (e.g., upgraded) within a virtual inventory, one or more virtual items being removed from a virtual inventory, and/or other awarding provision.

In some implementations, timed in-game tasks that take place in an online game may be persistent. That is, a wait period of a timed in-game task may continue on whether or not individual users are currently logged in to their user accounts and/or participating in the game. A user who logs out of their user account and then logs back in some time later may find that a wait period has decreased, has expired, and/or has changed in other ways.

In some implementations, wait periods may be known to users. In some implementations, a representation of a wait period may be presented to a user in views of the online game. By way of non-limiting example, a virtual clock, a timer, a counter, a stopwatch, a watch, a dial, an hourglass, and/or other time-representative item may be presented in the online game. A time-representative item may display an amount of time associated with a wait period of an in-game task. By way of non-limiting example, a time-representative item may show a countdown until expiration, may increase from zero to a final cut-off time, and/or may express wait periods in other ways. In some implementations, after initiation of a timed in-game task, a time-representative item may be presented in the online game adjacent to an in-game virtual item with which the task may be associated (see, e.g., FIG. 3).

In some implementations, wait periods may be communicated to users in other ways. By way of non-limiting example, wait periods may be communicated to users through in-game messaging, external messaging (e.g., SMS), and/or other communications. In some implementations, wait periods may be unknown to users.

In some implementations, a timed in-game task may include one or more of building a virtual item, crafting a virtual item, harvesting a virtual item, gathering a virtual item, training one or more game entities, upgrading a virtual item, battling other users and/or non-player characters, and/or other time-dependent in-game task. In some implementations, timed in-game tasks may or may not require additional user input after an initiation of the timed in-game task. By way of non-limiting example, a timed in-game task initiated by user input may be carried out to completion at the end of the wait period absent additional user input. In some implementations, a user may provide user input to redeem a corresponding virtual item at the expiration of a wait period associated with a timed in-game task.

In some implementations, building may correspond to a simulated construction of a virtual item within the online game. A simulated construction may include a virtual item appearing to be built "from the ground up." In some implementations, one or more non-player characters may be shown in the online game appearing to "build" a virtual item. In some implementations, building may correspond to a virtual item not being available within the online game at a first point in time, and being available to the user in the game at a subsequent point in time (e.g., after the wait period). In some implementations, building a virtual item may result in the virtual item being included in a virtual inventory of virtual items associated with a user account after the end of a wait period. In some implementations, building may correspond to repairing virtual damage on virtual items (e.g., after a battle, and/or other gameplay).

In some implementations, crafting may correspond to combining one or more virtual resources to create a virtual item. A crafted virtual item may be included in a virtual inventory associated with a user account after the end of a wait period. In some implementation, created virtual items may be unique depending on the virtual resources used. In some implementations, crafting a virtual item may require a predetermined amount of virtual resources, one or more predetermined types of virtual resources, and/or may require other virtual resources.

In some implementations, harvesting may correspond to replenishing a virtual item within a virtual inventory associated with a user account. For example, a virtual item, such as a virtual resource, may deplete in strength, quantity, effectiveness, and/or some other aspect. In some implementation, resource depletion may be timed based, use-based, participation based, and/or based on other factors. By way of non-limiting example, a virtual resource may deplete at a predetermined rate over a predetermined length of time. By way of non-limiting example, a virtual resource may deplete based on use of the resource by a user in the online game. By way of non-limiting example, a virtual resource may deplete based on a user's frequency of log-in to a user account of the online game. In some implementations, harvesting type tasks may replenish a depleted (or depleting) virtual resource. In some implementations, a virtual resource may not be completely replenished until an expiration of a wait period. In some implementations, a virtual resource may incrementally replenish over the course of the wait period. Portions of the virtual resource may be transferable to a user account during times before the end of the wait period.

In some implementations, gathering may correspond to acquiring a certain type and/or a certain amount of one or more virtual items to include in a virtual inventory. Gather may be accomplished through gameplay (e.g., finding virtual items within the game and/or providing user input to include them in a virtual inventory), trade (e.g., with other users and/or non-player characters), barter, purchase, and/or other mechanism for virtual item acquisition.

In some implementations, training may correspond to replenishing attributes of one or more game entities associated with a user. By way of non-limiting example, an attribute may be strength, valor, health, power, and/or other attribute. In some implementations, attributes of a game entity may deplete based on time, use, user participation, and/or other factor. In some implementations, the one or more game entities may not be available for gameplay until an expiration of a wait period.

In some implementations, upgrading may correspond to increasing attributes of a virtual item. By way of non-limiting example, an attribute of a virtual item may be strength, valor, health, power, and/or other attribute. In some implementations, an attribute of a game entity an attack move, a defense move, a level, a rank, a position, a weapon, and/or other attribute.

In some implementations, battling may correspond to one or more in-game actions associated with an objective and/or goal of an online game. Battling may be carried out against other users, other non-player characters, and/or against other game entities. Outcomes of battling may be determined based on attributes of a user account and/or attributes of an opponent. By way of non-limiting example, battling may result in a user account having relatively more XP, recourse, strength and/or other attribute winning a battle at the expiration of a wait period. In some implementations, battling may be carried out in other ways.

It is noted that the above examples of timed in-game task are provided for illustrative purposes only. As such, it is not to be considered limiting with respect to the type of in-game actions and/or in-game activity that may take place on a time-dependent basis and/or how an in-game action and/or in-game activity may affect virtual items in a virtual inventory. By way of non-limiting example, in some implementations, timed in-game task may be associated with other gameplay mechanics.

In FIG. 1, providing a virtual space may include hosting the virtual space over a network 120, such as the Internet. A host server 102 may include one or more processors 104 configured to execute machine-readable instructions 106 to facilitate incentivizing user log-in to a user account of an online game taking place in the virtual space. The machine-readable instructions 106 may include one or more components for implementing an instance of a virtual space and/or an online game taking place within the virtual space and to facilitate the participation of one or more users in the virtual space and/or the online game. The machine-readable instructions 106 may include one or more of a user component 108, a space component 110, a shop component 111, an engagement component 112, an award component 114, a redemption component 116, and/or other components.

The server 102 may be configured to communicate with one or more computing platforms 122 according to client/server architecture, and/or other communication scheme. The computing platforms 122 may include, for example, a cellular telephone, a smartphone, a laptop, a tablet computer, a desktop computer, a television set-top box, smart TV, a gaming console, and/or other platform. The users may access system 100 and/or the virtual space via the computing platforms 122 by logging in to their user accounts.

In some implementations, one or more features and functions of server 102 may be attributed to one or more computing platforms 122. By way of non-limiting example, individual ones of the computing platforms 122 may include machine-readable instructions comprising the same or similar components as machine-readable instructions 106 of server 102. The computing platforms 122 may be configured to locally implement an instance of a virtual space and/or an online game taking place within the virtual space and/or facilitate participation of one or more users in the virtual space and/or the online game.

The user component 108 may be configured to access and/or manage one or more user accounts and/or other user information associated with users of the system 100. The one or more user accounts may include information stored by server 102, one or more of the computing platforms 122, and/or other storage locations. The user account may include, for example, information identifying users within the virtual space, security login information, subscription information, virtual (or real) currency account information, virtual inventory information, information regarding timed in-game tasks, relationship information, virtual space usage information, participation information, demographic information associated with users, interaction history among users in the virtual space, information stated by users, browsing history of users, a computing platform identification associated with a user, a phone number associated with a user, and/or other information related to users.

In some implementations, information identifying users may include a username or handle, a number, an identifier, and/or other identifying information. Security login information may include a login code, password, and/or other information. Virtual (or real) currency account information may include information related to currency held in credit for a user. Virtual inventory information may include virtual inventories associated with the users that include one or more virtual items available for the users in the virtual space and/or online game. Relationship information may include information related to relationships between users in the virtual space.

In some implementation, the user component 108 may be configured such that user accounts include information regarding timed in-game tasks associated with the user accounts. By way of non-limiting example, the user component 108 may be configured to obtain information conveying user input to initiate a timed in-game task and/or other information. The user component 108 may be configured to determine a start time corresponding to the initiation of a timed in-game task. The user component 108 component may be configured to determine a wait period associated with a timed in-game task. The user component 108 may be configured to determined end times of the timed in-game task based on the start times, wait periods, and/or other information. In some implementations, start times, end times, and/or wait periods may be based on real-world time, virtual time, and/or other time measure.

In some implementations, the user component 108 may be configured such that user accounts include virtual space (and/or online game) usage information. The virtual space (and/or online game) usage information may convey a frequency of log-in, a velocity of log-in, an amount of times a user logged in to a user account, and/or other information. In some implementations, the usage information may convey whether a user is currently logged in or logged out. Usage information may include other information.

In some implementations, the user component 108 may be configured to determine user account activity based on the usage information and/or other information. By way of non-limiting example, the user component 108 may be configured to express user account activity numerically, descriptively, progressively, pictorially, and/or expression of user account activity.

In some implementations, a numerical expression of user account activity may comprise one or more of a point, amount, score, rank, ratings, grades, degree, or other type of numerical value. A descriptive expression of user account activity may include one or more of very active, active, moderately active, at-risk for being inactive, inactive, and/or other description. A progressive expression of user account activity may include one or more of more active, less active, and/or other progressive description. A pictorial expression of user account activity may include one or more of a thumbs up, a thumbs down, and/or other imagery.

In some implementations, user account activity may be determined based on user log-in history and/or other usage information. In some implementations, one or more thresholds for amount of log-ins, frequency of log-ins, velocity of log-ins, and/or duration of log-in may be determined. A given threshold may provide a basis for determining user account activity. By way of non-limiting example, by comparing an amount of times a user has logged in, a frequency of log in, velocity of log-in, average log-in duration and/or other usage information to one or more respective thresholds, the user account may be determined to be one or more of active, moderately active, at-risk for being inactive, inactive, and/or other expression of user account activity. By way of non-limiting example, a first activity level of a first user account may be determined based on a comparison of a first frequency of log-in to the first user account with a first threshold frequency of log-ins.

In some implementations, usage information may include information conveying times of day a user may be logged in or out, in-game events that may trigger a user to log in and/or out, external events that may trigger a user to log in or out, and/or other information. For example, in-game and/or external events may be events that may take the user away from participation in an online game, may drive user participation in the online game, and/or may illicit other behavior. By way of non-limiting example, the user component 108 may be configured to determine a first trigger associated with a user logging out of a user account. The user component 108 may be configured to determine a second trigger associated with a user logging into a user account.

In some implementations, an external event that may trigger a user to log in and/or out may be a scheduled real-world item included in a calendar stored in a computing platform associated with the user, an incoming or outgoing communication (e.g., a text message, email, phone call, and/or other communication), and/or other triggers. By way of non-limiting example, a user may have a time slot on an electronically stored calendar that conveys free time. The user may log in to a user account during the free time to play the game. The user component 108 may be configured to determine that time slots in an electronically stored calendar that convey free time may comprise triggers that illicit a user behavior of logging in.

In some implementations, an in-game event that may trigger a user log-in and/or log-out may include an initiation and/or expiration of a timed in-game task; a start and/or completion of one or more game tasks, objectives, and/or goals; an in-game communication with one or more users; and/or other in-game events. By way of non-limiting example, a user may complete a level in a game and/or participate in the online game in other ways. Thereafter the user may log out since they may be bored and/or otherwise may be done playing for the time being. The user component 108 may be configured to determine that "completion of a level" may be a trigger that illicit a user behavior of logging out.

In some implementations, an in-game trigger may include an initiation of a timed in-game task. For example, a user may log out of a user account after a timed in-game task is initiated, at some time following an initiation of a timed in-game task, and/or at other times. In some implementations, an initiation of a timed in-game task may be determined as a trigger that may illicit a user behavior of logging out. In some implementations, a user may subsequently log back in at or around an expiration of a wait period so that they can take advantage of a virtual item and/or resource that may be associated with the timed in-game task. As such, an expiration of a wait period may be determined as a trigger that may illicit a user behavior of logging back in to a user account.

In some implementations, the user component 108 may be configured such that user accounts may include participation information conveying on-going activities of the user accounts. By way of non-limiting example, the participation information may include information indicating entries and/or selections of virtual items within the online game by a user of a user account, social activity, and/or other information. Social activity within the virtual space may correspond to one or more social interactions by a user with one or more other users of the virtual space and/or online game. Social interactions may include, for example, in-game communications with one or more other users, participating in gameplay with one or more other users (e.g., cooperative gameplay and/or other multiplayer gameplay), and/or other social interactions a user may engage in with other users of the virtual space and/or online game. The participation information may include information used to determine whether one or more aspects of redemption criteria have been satisfied. By way of non-limiting example, participation information may convey whether a user has provided entry and/or selection of an in-game virtual item in accordance with redemption criteria, has participated in specified in-game social activity in the online game, and/or has satisfied other participation requirements in accordance with redemption criteria for redeeming an award associated with a timed in-game task.

Figure 2:
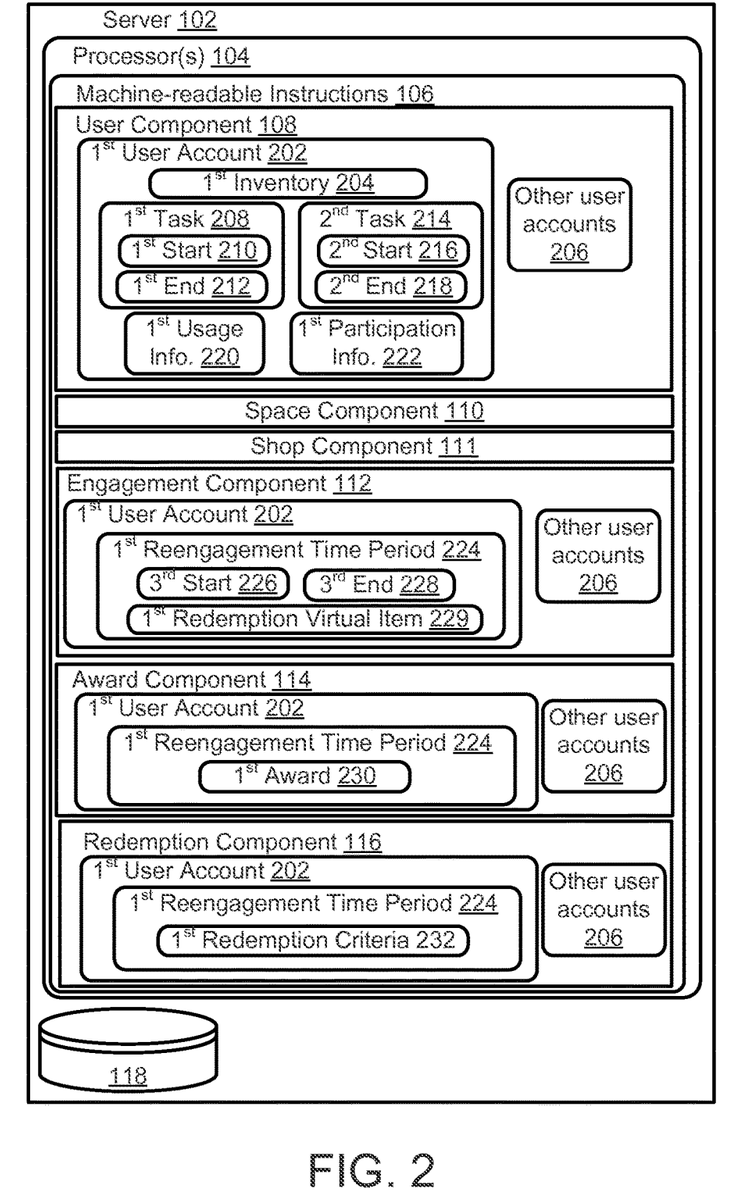
FIG. 2 illustrates an implementation of a server employed in the system of FIG. 1.

By way of illustration in FIG. 2, the user component 108 may be configured to manage a first user account 202 and/or other user accounts 206. The first user account 202 may be associated with a first user and/or other users. The first user account 202 may include a first virtual inventory 204 of virtual items available to a user of the first user account 202. The first user account 202 may include information associated with a first timed in-game task 208, a second timed in-game task 214, and/or other timed in-game tasks. The first timed in-game task 208 may be associated a first start time 210 and/or a first end time 213. The first start time 210 and/or the first end time 213 may inherently define a wait period of the first timed in-game task 208. The second timed in-game task 214 may be associated with a second start time 216 and/or a second end time 218. The second start time 216 and/or the second end time 218 may inherently define a wait period of the second timed in-game task 214. The first user account 202 may include first usage information 220 including a first log-in history conveying an amount, frequency, velocity, duration of log-in, and/or other information associated with user log-in to the first user account 202. The first user account 202 may include first participation information 222 indicating on-going activities by a user of the user account in the online game. By way of non-limiting example, the first participation information 222 may include information indicating that the user may have provided entry and/or selection of a virtual item within the online game.

Returning to FIG. 1, the space component 110 may be configured to implement an instance of the virtual space executed by the computer components to determine state of the virtual space. The state may be communicated (e.g., via streaming visual data, object/position data, and/or other state information) from server 102 to computing platforms 122 for presentation on displays of the computing platforms 122. The state determined and transmitted to a given computing platform 122 may correspond to a view for a game entity being controlled by user input via input devices (e.g., a controller, touch-responsive display screen) at the given computing platform 122. The state determined and presented to a given computing platform 122 may correspond to a location in the virtual space (e.g., location in the game). The view described by the state for the given computing platform 122 may correspond, for example, to the location from which the view is taken, the location the view depicts, and/or other locations, a zoom ratio, a dimensionality of objects, a point-of-view, and/or parameters of the view. One or more of the view parameters may be selectable by the users.

An instance of the virtual space may comprise a simulated space that is accessible to users via clients (e.g., computing platforms 122) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In some instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). An instance executed by the computer components may be synchronous, asynchronous, and/or semi-synchronous.

The above description of the manner in which the state of the virtual space is determined by space component 110 is not intended to be limiting. The space component 110 may be configured to express the virtual space in a more limited, or richer, manner. For example, views determined for the virtual space representing the state of the instance of the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the virtual space executed by space component 110, users may provide input to control game entities, simulated physical phenomena (e.g., wind, rain, earthquakes, and/or other phenomena), and/or other elements within the virtual space to interact with the virtual space and/or each other. The game entities may include virtual characters such as avatars. A game entity may be controlled by the user with which it is associated. The user-controlled element(s) may move through and interact with the virtual space (e.g., non-user characters in the virtual space, other objects in the virtual space). The user-controlled elements controlled by and/or associated with a given user may be created and/or customized by the given user. The user may have an "inventory" of virtual items and/or currency that the user can use (e.g., by manipulation of a game entity or other user-controlled element, and/or other items) within the virtual space.

The users may interact with each other through communications exchanged within the virtual space. Such communications may include one or more of textual chat, instant messages, private messages, voice communications, and/or other communications. Communications may be received and entered by the users via their respective computing platforms 122. Communications may be routed to and from the appropriate users through server 102 (e.g., through space component 110) and/or through communications which are external to the system 100 (e.g., text messaging services associated with the computing platforms 122).

The users may participate in the instance of the virtual space by effectuating one or more timed in-game tasks, as presented herein. Users may provide input via a computing platform 122 to initiate a timed in-game task. By way of non-limiting example, a user may tap a virtual item displayed on a touch-sensitive display of a computing platform 122 to initiate a timed in-game task associated with that time. Timed in-game tasks may be initiated in other ways.

The instance of the virtual space and/or the online game that takes place therein may be persistent. That is, the virtual space and/or the game may continue on whether or not individual players are currently logged in and/or participating in the game. A player who logs out of the virtual space and then logs back in some time later may find the virtual space has been changed through the interactions of other players with the virtual space during the time the player was logged out. These changes may include changes to the simulated physical space, changes in the player's inventory, changes in other players' inventories, changes in wait periods of timed in-game tasks, changes experienced by non-player characters, changes to the virtual items available for use in the online game, and/or other changes.

Returning to FIG. 1, in some implementations, the shop component 111 may be configured to present offers to sell instances of virtual items to users in a virtual shop. The virtual shop may be a simulated environment within the virtual space which is accessible by users and presents the views of the virtual shop to the users. Users may access the virtual shop through one of a variety of ways. Users may access the virtual shop through the manipulation of one or more entities associated with the user within the virtual space using control inputs and/or commands input by the users through computing platforms 122, and/or by other ways of access.

Manipulation of a game entity may include moving the game entity through the virtual space using control inputs and/or commands input by the users through computing platforms 122 to move the one or more entities to the simulated environment designating the location of the virtual shop within the virtual space.

Users may use control inputs and/or commands not associated with a game entity to access the virtual shop. Control inputs and/or commands may automatically present the instance of the virtual shop on the computing platforms 122 (e.g., user selects a virtual shop button to automatically be taken to the virtual shop).

The instance of the virtual shop may be presented to users through a shop interface. The shop interface may be configured to present the offers to sell virtual items to users. The shop interface may be configured to receive entry and/or selection of individual offers by the users to effectuate acceptance and/or purchase of the offers at a virtual (or real) currency purchase price.

The simulated environment of the virtual shop may have topography. The virtual shop may express ongoing real-time interaction by one or more users (e.g., may have limited stock of virtual items for sale which can be purchased by one or more users within the virtual space and which can be depleted), and/or include one or more objects (e.g., one or more virtual items, a virtual teller, and/or other objects) positioned within the topography that may be capable of locomotion within the topography. The virtual shop may display the virtual items and/or the one or more sets of virtual content available for purchase by the users. Users may view the virtual items (e.g., individual virtual items and/or sets of virtual items) available for purchase. Users may purchase the virtual items using virtual (or real) currency. Transactions may take place with the virtual teller, through various other actions of the user within the instance of the virtual shop, and/or other offer/transaction mechanisms. In some implementations, the virtual shop component 111 may be configured to manage transfer of instances of virtual items of value and instances of placeholder items to user inventories in response to purchase of the virtual items of value and placeholder items.

The engagement component 112 may be configured to determine reengagement time periods for individual ones of the user accounts. The reengagement time periods may be determined to expire at times other than the expirations of wait periods for ongoing in-game tasks associated with the individual user accounts. The reengagement time periods may be determined to expire at one or more specific times and/or over one or more specific time periods. In some implementations, the reengagement time periods may be determined to expire at one or more specific times and/or time periods at which a user may be logged out of a user account, at which a user may be expected to be logged out (e.g., whether or not they are actually logged out), and/or other times and/or time periods. In some implementations, the one or more specific times and/or time periods may be determined based on present wait periods of ongoing timed in-game tasks and/or other information. For example, the reengagement time periods may be determined to expire at times during wait periods of one or more ongoing timed in-game tasks and/or at other times that a user may historically be determined to be logged off.

In some implementations, the engagement component 112 may be configured to determine start times and/or end times (expirations) for individual ones of the reengagement time periods. In some implementations, a start time may be determined based on one or more triggers. A trigger may include one or more in-game and/or external triggers, as presented herein. By way of non-limiting example, a trigger for reengagement time period may include an initiation of a timed in-game task and/or other trigger. By virtue of a user providing input to initiate a timed in-game task, a start time of a reengagement time period may be determined and/or the reengagement time period may be start to count down from the determined start time. For example, a timed in-game task may be initiated at time X. A reengagement time period may be determined to start at time X, shortly thereafter, and/or other time in relation to the initiation of the timed in-game task. Start times of reengagement time periods may be determined in other ways.

In some implementations, a given end time may be determined to occur during wait periods of one or more ongoing timed in-game tasks, during a time period that a user may historically be logged off, during a time period hat a user may actually be logged off, and/or other time periods. By way of non-limiting example, based on a first wait period, a second wait period, and/or other wait periods of ongoing timed in-game tasks, the engagement component 112 may be configured to determine a first end time of a first reengagement time period that is prior to the expirations of the first wait period, second wait period, and/or other wait periods.

In some implementations, an end time that lies within one or more present wait periods and/or other time periods may be determined stochastically, deterministically, and/or by other techniques. In some implementations, the determination of end times as either deterministic or stochastic may be conveyed to a user. In some implementations, the determination of end times as either deterministic or stochastic may be unknown to a user.

Stochastic determination may provide end times that vary between instances of reengagement time periods determined for a user. Stochastic determination may enhance a user's experience with the online game since they may not be able to anticipate expirations of the reengagement time periods prior to their determination. Thus, the times at which a user logs into a user account in accordance with the expirations of the reengagement time periods may substantially vary between different instances of reengagement time periods.

In some implementations, the engagement component 112 may be configured to determine end times based on one or more deterministic specifications provided by a provider, administrator, moderator, and/or other entities related to the virtual space. A specification may include one or more of a function, formulas, table, and/or other specifications. For example, a given specification may specify one or more end times based on one or more inputs. An input may include, for example, a type of a timed in-game tasks whose initiation triggered a start of an reengagement time period, types of one or more ongoing timed in-game tasks with wait periods present at the time of triggering of the reengagement time period, a participation history of a user, a redemption history of a user conveying the amount of times a user has redeemed an award associated with a reengagement time period, one or more attributes of a user account, and/or other inputs.

By way of non-limiting example, a specification may specify that for a given timed in-game task whose initiation triggered a start of a reengagement time period, a given end time and/or pool of possible end times for the reengagement time period may be determined. In some implementations, one or more of the possible end times may be weighted. By way of non-limiting example, one or more of the possible end time may be weighted based on user log-in frequency, virtual currency held in a virtual inventory, random weighting, other ongoing timed in-game task with present wait times, attributers of a user account, and/or other information.

Figure 4:
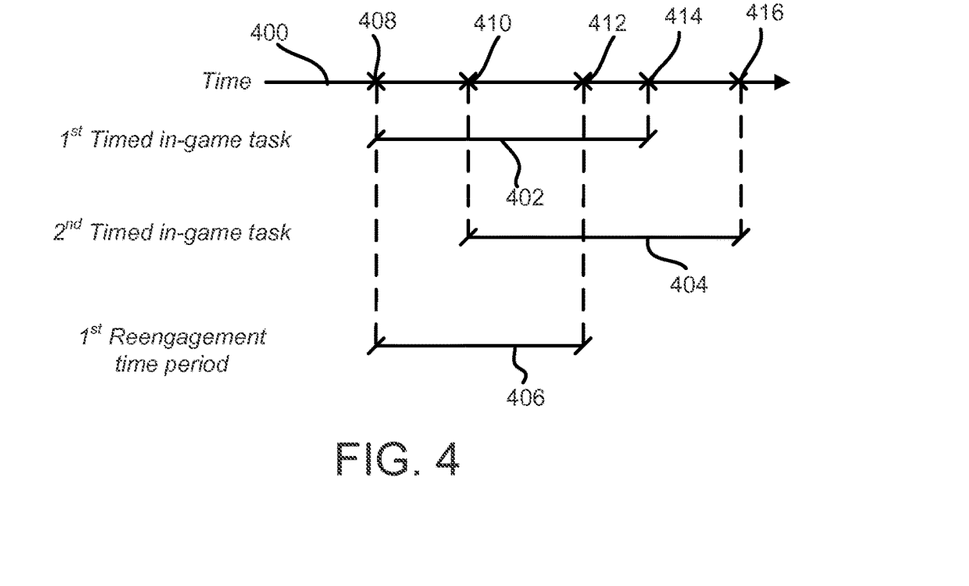
FIG. 4 illustrates a visual timeline depicting a determination of a reengagement time period based on one or more ongoing timed in-game tasks, in accordance with one or more implementations.

By way of non-limiting illustration in FIG. 4, a visual timeline is shown depicting a time dimension 400, a first reengagement time period 406, a first wait period 402 of a first timed in-game task, and a second wait period 404 for a second timed in-game task. The first reengagement time period 406 may be determined based on the first wait period 402, the second wait period 404, and/or other information. The first reengagement time period 406 may be defined by first start time 408 and/or a first end time 412. The first wait period 402 may be defined by the first start time 408 and/or a second end time 414. The second wait period 404 may be defined by a second start time 410 and/or a third end time 416. The first start time 408 of the first reengagement time period 406 may be determined based on a trigger. By way of non-limiting example, the trigger may comprise the initiation of the first timed in-game task. The first wait period 402 and the first reengagement time period 406 may have the same or similar start time. The first reengagement time period 406 may be determined to expire before the expirations of the first wait period 402 and/or second wait period 404. The first end time 412 may occur temporally before the second end time 414 and/or third end time 416. The first end time 412 may be determined deterministically, stochastically, and/or by other techniques. By way of non-limiting example, the first end time 412 may be deterministically determined based on the type of the first timed in-game task, the type of the second timed in-game task, and/or other information.

In some implementations, the engagement component 112 may be configured to effectuate presentation of redemption virtual items within views of the online game presented by computing platforms 122. Individual computing platforms 122 may be associated with individual ones of the user accounts. A redemption virtual item may be associated with one or more of a displayed countdown of a reengagement time period, an acquisition of an award associated with an expiration of the reengagement time periods, and/or other aspect of the online game. By way of non-limiting example, a redemption virtual item may include one or more of a virtual clock, a timer, a counter, a stopwatch, a watch, a dial, an hourglass, and/or other time-representative item displayed in the online game configured to convey the time associated with a corresponding reengagement time period. In some implementations a redemption virtual item may be selectable by a user via input provided through a computing platform 122 presenting the online game. The participation information of a user account may convey information indicating reception of user input corresponding to entry and/or selection of a redemption virtual item.

By way of non-limiting illustration in FIG. 2, the engagement component 112 may be configured to determine a first reengagement time period 224. The first reengagement time period 224 may be determined for the first user account 202. The first reengagement time period 224 may be determined based on one or more present wait periods for one or more ongoing timed in-game tasks associated with the first user account 202. The first reengagement time period 224 may be determined based on present wait times for the first timed in-game task 208, the second timed in-game task 214, and/or other ongoing timed in-game task associated with the first user account 202. The first reengagement time period 224 may include a third start time 226 and/or a third end time 228. The span of time between the third start time 226 and third end time 228 may inherently define the time period of the first reengagement time period 224.

In some implementations, the third start time 226 may be triggered based on one or more of the first start time 210, the second start time 216, and/or other triggers. By way of non-limiting example, the third start time 226 may be the same as, or close to, the first start time 210 and/or second start time 216. In some implementations, the third end time 228 may be determined based on one or more of the first end time 212, the second end time 218, and/or other end times. By way of non-limiting example, the third end time 228 may be determined to be some time prior to the end of one or more of the first end time 212, second end time 218, and/or other end times. The first end time 228 may be determined stochastically, deterministically, and/or by other techniques.

In some implementations, the engagement component 112 may be configured to effectuate presentation of a first redemption virtual item 229 in a view of the online game presented on a first computing platform associated with the first user account 202.

Returning to FIG. 1, the award component 114 may be configured to determine one or more awards to associate with the expirations of the reengagement time periods. The award component 114 may be configured to associate the determined one or more awards with the respective expirations of the reengagement time periods. In some implementations, awards for individual reengagement time period may be communicated to users prior to the expirations of reengagement time period (e.g., via one or more notifications communicated at a start of a reengagement time period and during a reengagement time period). In some implementations, awards for individual reengagement time periods may not be revealed to the users until the expirations of the reengagement time periods and/or until the user accounts convey satisfaction of award redemption criteria.

In some implementations, the award component 114 may be configured to determine the awards based on information included in user accounts. For example, awards may be determined based on one or more of a user's log-in history, account activity, a game entity attribute associated with the user account (e.g., type, rank, class, status, level, XP, and/or other user attribute), items present in a virtual inventory of the user account, and/or other information.

In some implementations, awards may be determined based on activity levels, and/or other information. Awards within a first value range may be determined for user accounts associated with a first activity level. Awards within a second value range may be determined for user accounts associated with a second activity level. By way of non-limiting example, awards within a first value range may be determined for user accounts that convey a frequency and/or other measure of log-in that is above a threshold level. Awards within a second value range may be determined for user accounts that convey a frequency and/or other measure of log-in that is below a threshold level. By way of non-limiting example, awards of a first value may be determined for user accounts that convey a frequency and/or other measure of log-in that is above a threshold level. Awards of a second value may be determined user accounts that convey a frequency and/or other measure of log-in that is below a threshold level.

In some implementations, awards of higher value may be associated with reengagement time periods of user accounts that convey an activity level that is less than at least moderately active (or other activity level) in order to incentivize user log-in at times they may be logged out. By way of non-limiting example, an award having a relatively high value may be associated with a reengagement time period of a user account that may be at-risk for inactivity. An award of a lesser than high value may be associated with a reengagement time period of a user account that may be moderately active. An award of still lesser value may be associated with a reengagement time period of a user account that may be active.

In some implementations, the award component 114 may be configured to determine awards based on one or more specifications provided by a provider, administrator, moderator, and/or other entities related to the virtual space. A specification may include one or more of a function, formula, table, or other types of specifications. For example, a given specification may specify an "activity level-for-award" and/or other specification. By way of non-limiting example, for a given activity level of a user account a given specification may be provided by the provider(s) of the virtual space specifying values of awards that may be determined for reengagement time period of the user account. In some implementations, determination of awards may be weighted, stochastic, and/or determined in other ways.

By way of non-limiting illustration in FIG. 2, the award component 114 may be configured to determine a first award 230 and/or other awards for the first reengagement time period 224 and/or other awards for other reengagement time periods. The award component 114 may be configured to associate the first award 230 with the expiration of the first reengagement time period 244.

Returning to FIG. 1, the redemption component 116 may be configured to determine redemption criteria associated with providing one or more awards to a user account after an expiration of a reengagement time period. Redemption criteria may correspond to user accounts conveying certain user in-game activity. A user account may convey satisfaction of the redemption criteria before the user account may receive an award. In some implementations, redemption criteria may include one or more of a user account conveying user log-in before, after, and/or during an expiration of a reengagement time period; a user account conveying user entry and/or selection of a redemption virtual item displayed in the online game before, after, and/or during an expiration of a reengagement time period; a user account conveying specified social activity within the virtual space before, after, and/or during an expiration of a reengagement time period; and/or a user account conveying other in-game activity by a user of the user account.

The redemption component 116 may be configured to provide the one or more awards to the user accounts based on the expiration of the reengagement time periods and the user accounts conveying satisfaction of award redemption criteria. Providing the one or more awards may comprise including the awards and/or instances of the awards in the virtual inventories of the user accounts. By way of non-limiting example, when a reengagement time period has expired and a user account conveys satisfaction of redemption criteria, an award associated with the expiration of the reengagement time period may be include in a virtual inventory of the user account.

By way of non-limiting illustration in FIG. 2, the redemption component 116 may be configured to determine first redemption criteria 232 for redeeming the first award 230 of the first reengagement time period 224. The redemption component 116 may be configured to provide the first award 230 to the first user account 202 based on an expiration of the first reengagement time period 224 and the first user account 202 conveying satisfaction of the first redemption criteria 232.

Figure 3:
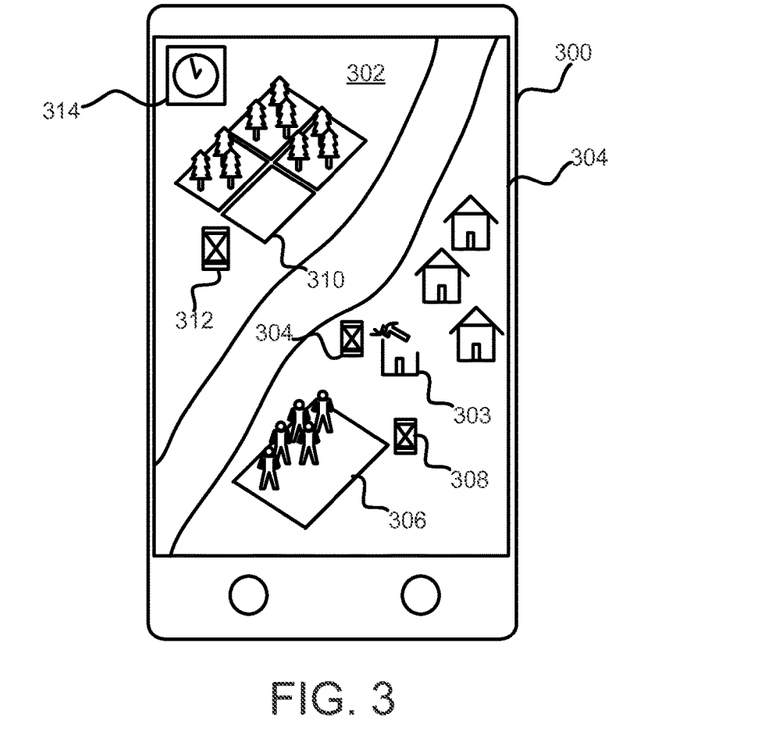
FIG. 3 illustrates an implementation of a user interface presented on a computing platform associated with a user account.

By way of non-limiting illustration in FIG. 3, an exemplary implementation of a computing platform 300 presenting an online game 302 is shown. The computing platform 300 may comprise, for example, a handheld smartphone, and/or other computing platform. The computing platform 300 may include a display 304. The display 304 may comprise, for example, a touch-responsive display screen. The user may provide user input via the display 304.

The online game 302 may include virtual items displayed within a simulated topography. One or more virtual items may be associated the timed in-game task. By way of non-limiting example, a first timed in-game task 303 may be associated with building a virtual item (e.g., a virtual house). A second timed in-game task 306 may be associated with training game entities. A third timed in-game task 310 may be associated with harvesting virtual resources. In some implementations, the timed in-game tasks may include representations of wait periods associated with the timed in-game tasks. By way of non-limiting example, a virtual clock, a timer, a counter, a stopwatch, a watch, a dial, an hourglass, and/or other time-representative item may be presented in the online game. For example, a first time-representative item 304 may be displayed adjacent the first timed in-game task 303. The first time-representative item 304 may convey a wait period associated with the first timed in-game task 303. A second time-representative item 308 may be displayed adjacent to the second timed in-game task 306. The second time-representative item 308 may convey a wait period associated with the second timed in-game task 306. A third time-representative item 312 may be displayed adjacent the third timed in-game task 310. The third time-representative item 312 may convey a wait time associated with the third timed in-game task 310.

The online game 302 may include a redemption virtual item 314 displayed in views of the online game 302. The redemption virtual item 314 may be associated with a reengagement time period. The redemption virtual item 314 may include one or more of a virtual clock, a timer, a counter, a stopwatch, a watch, a dial, an hourglass, and/or other time-representative item. The redemption virtual item 314 may convey an amount of time remaining for the reengagement time period. A user of the computing platform 300 may redeem an award associated with the reengagement time period based on redemption virtual item 314 conveying an expiration of the reengagement time period and/or the user account providing user input to satisfy redemption criteria. By way of non-limiting example, redemption criteria may include the user logging in to a user account, selecting the redemption virtual item 314, and/or other activity. By way of non-limiting example, the user may tap the redemption virtual item 314 on the display 304 once they are logged in and the reengagement time period has expired.

Returning to FIG. 1, the server 102, computing platforms 122, and/or external resources 36 may be operatively linked via one or more electronic communication links. For example, such electronic communication links may be established, at least in part, via a network 120 such as the Internet and/or other networks. It will be appreciated that this is not intended to be limiting and that the scope of this disclosure includes implementations in which server 102, computing platforms 122, and/or external resources 124 may be operatively linked via some other communication media.

The external resources 124 may include sources of information, hosts and/or providers of virtual spaces outside of system 100, external entities participating with system 100, external entities for player-to-player communications, and/or other resources. In some implementations, some or all of the functionality attributed herein to external resources 124 may be provided by resources included in system 10.

The server 102 may include electronic storage 118, one or more processors 104, and/or other components. The server 102 may include communication lines or ports to enable the exchange of information with a network and/or other computing platforms. Illustration of server 102 in FIG. 1 is not intended to be limiting. The server 102 may include a plurality of hardware, software, and/or firmware components operating together to provide the functionality attributed herein to server 102. For example, server 102 may be implemented by a cloud of computing platforms operating together as server 102.

Electronic storage 118 may comprise electronic storage media that electronically stores information. The electronic storage media of electronic storage 118 may include one or both of system storage that is provided integrally (i.e., substantially non-removable) with server 102 and/or removable storage that is removably connectable to server 102 via, for example, a port or a drive. A port may include a USB port, a firewire port, and/or other port. A drive may include a disk drive and/or other drive. Electronic storage 118 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 118 may include one or more virtual storage resources (e.g., cloud storage, a virtual private network, and/or other virtual storage resources). Electronic storage 118 may store software algorithms, information determined by processor 104, information received from server 102, information received from computing platforms 122, and/or other information that enables server 102 to function as described herein.

Processor(s) 104 is configured to provide information processing capabilities in server 102. As such, processor 104 may include one or more of a digital processor, an analog processor, a digital circuit designed to process information, an analog circuit designed to process information, a state machine, and/or other mechanisms for electronically processing information. Although processor 104 is shown in FIG. 1 as a single entity, this is for illustrative purposes only. In some implementations, processor 104 may include one or more processing units. These processing units may be physically located within the same device, or processor 104 may represent processing functionality of a plurality of devices operating in coordination. The processor 14 may be configured to execute components 108, 110, 111, 112, 114, and/or 116. Processor 14 may be configured to execute components 108, 110, 111, 112, 114, and/or 116 by software; hardware; firmware; some combination of software, hardware, and/or firmware; and/or other mechanisms for configuring processing capabilities on processor 14.

It should be appreciated that although components 108, 110, 111, 112, 114, and/or 116 are illustrated in FIG. 1 as being co-located within a single processing unit, in implementations in which processor 104 includes multiple processing units, one or more of components 108, 110, 111, 112, 114, and/or 116 may be located remotely from the other components. The description of the functionality provided by the different components 108, 110, 111, 112, 114, and/or 116 described above is for illustrative purposes and is not intended to be limiting, as any of components 108, 110, 111, 112, 114, and/or 116 may provide more or less functionality than is described. For example, one or more of components 108, 110, 111, 112, 114, and/or 116 may be eliminated, and some or all of its functionality may be provided by other ones of components 108, 110, 111, 112, 114, 116, and/or other components. As another example, processor 14 may be configured to execute one or more additional components that may perform some or all of the functionality attributed below to one of components 108, 110, 111, 112, 114, and/or 116.

Figure 5:
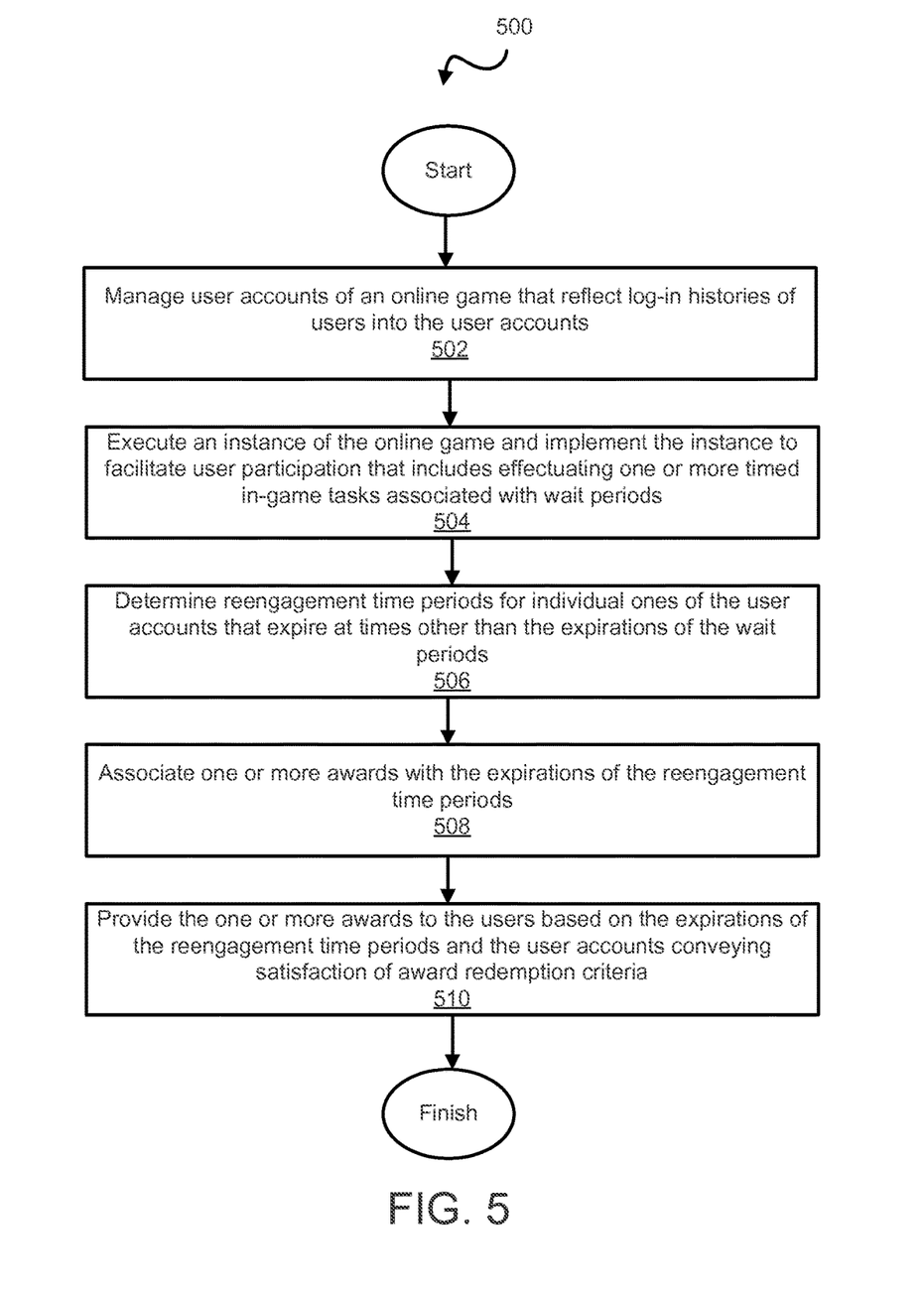
FIG. 5 illustrates a method of incentivizing user log-in to a user account associated with an online game, in accordance with one or more implementations.

FIG. 5 illustrates a method 500 of incentivizing user login to a user account of an online game. The operations of method 500 presented below are intended to be illustrative. In some embodiments, method 500 may be accomplished with one or more additional operations not described, and/or without one or more of the operations discussed. Additionally, the order in which the operations of method 500 are illustrated in FIG. 5 and described below is not intended to be limiting.

In some embodiments, method 500 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 500 in response to instructions stored electronically on electronic storage medium. The one or more processing devices may include one or more devices configured through hardware, firmware, and/or software to be specifically designed for execution of one or more of the operations of method 500.

Referring now to method 500 in FIG. 5, at an operation 502, user accounts associated with the users of an online game may be managed. The user accounts may reflect log-in histories of the user accounts, and/or other information. By way of non-limiting example, a first user account may be managed. The first user account may be associated with a first user and/or other users. In some implementations, operation 502 may be performed by a user component the same as or similar to user component 108 (shown in FIG. 1 and described herein).

At an operation 504, an instance of the online game may be executed. The instance of the online game may be implemented to facilitate user participation in the online game that takes place in a virtual space. User participation may include effectuating one or more timed in-game tasks associated with wait periods. By way of non-limiting example, initiation of a first timed in-game task may be in response to user input associated with the first user account. Initiation may begin a first wait period associated with the first timed in-game task. The first timed in-game task may be completed at the end of the first wait period without further user input associated with the first user account. In some implementations, operation 504 may be performed by a space component the same as or similar to the space component 110 (shown in FIG. 1 and described herein).

At an operation 506, reengagement time periods for individual ones of the user accounts may be determined. The reengagement time periods may be determined to expire at times other than the expirations of wait periods for ongoing in-game tasks associated with the individual user accounts. By way of non-limiting example, a first reengagement time period may be determined for the first user account based on one or more present wait periods for one or more ongoing in-game tasks associated with the first user account. In some implementations, operation 506 may be performed by an engagement component the same as or similar to the engagement component 112 (shown in FIG. 1 and described herein).

At an operation 508, one or more awards may be associated with the expirations of the reengagement time periods. By way of non-limiting example, a first award may be associated with the expiration of the first reengagement time period. In some implementations, operation 508 may be performed by an award component the same as or similar to the award component 114 (shown in FIG. 1 and described herein).

At an operation 510, one or more awards may be provided to the user accounts based on the expiration of the reengagement time periods and the user accounts conveying satisfaction of award redemption criteria. By way of non-limiting example, the first award may be provided to the first user account based on the expiration of the first reengagement time period and a determination that the first user account conveys satisfaction of first redemption criteria. In some implementations, operation 508 may be performed by a redemption component the same as or similar to the redemption component 116 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system for incentivizing user log-in to a user account associated with an online game, the system comprising:
   one or more physical processors configured by computer-readable instructions to:
   manage user accounts associated with the users of the online game, the user accounts reflecting log-in histories of the user accounts, the user accounts including a first user account associated with a first user;
   execute an instance of the online game and implement the instance of the online game to facilitate user participation in the online game that takes place in a virtual space;
   determine reengagement time periods for individual ones of the user accounts, the reengagement time periods being determined to expire at times at which the users are expected to be logged out, wherein when the users are expected to be logged out of the individual ones of the users accounts is determined based on scheduled in-game events, such that a first reengagement time period is determined for the first user account based on when the first user is expected to be logged out of the first user account, wherein when the first user is expected to be logged out of the first user account is determined based on one or more of the scheduled in-game events;
   associate one or more awards with expirations of the reengagement time periods, including associating a first award with an expiration of the first reengagement time period; and
   provide the one or more awards to the user accounts based on the expiration of the reengagement time periods and the user accounts conveying satisfaction of award redemption criteria, such that the first award is provided to the first user account based on the expiration of the first reengagement time period and a determination that the first user account conveys satisfaction of first redemption criteria.

2. The system of claim 1, wherein the one or more physical processors are further configured by computer-readable instructions such that the reengagement time periods are determined to expire during the one or more in-game events and before expirations of the one or more in-game events, wherein the first reengagement time period is determined to expire during the first wait period and before an expiration of the first wait period.

3. The system of claim 1, wherein the one or more physical processors are further configured by computer-readable instructions to determine, from a first log-in history reflected by the first user account, one or more times that the first user is not logged into the first user account, and wherein the reengagement time periods are determined to expire during at least one of the determined times.

4. The system of claim 1, wherein the one or more physical processors are further configured by computer-readable instructions such that the first redemption criteria corresponds to logging in to the online game, such that the determination that the first user account conveys satisfaction of the first redemption criteria is based on the first user account conveying that the first user is logged in to the online game.

5. The system of claim 1, wherein the one or more physical processors are further configured by computer-readable instructions such that the first redemption criteria corresponds to user entry and/or selection of in-game virtual objects after the expiration of the reengagement time periods, such that the determination that the first user account conveys satisfaction of the first redemption criteria is based on the first user account conveying that the first user entered and/or selected a first in-game virtual object after the expiration of the first reengagement time period.

6. The system of claim 5, wherein the one or more physical processors are further configured by computer-readable instructions such that the entry and/or selection of in-game virtual objects is facilitated by touch-responsive displays of computing platforms associated with the user accounts and used to present the instance of the online game including the in-game virtual objects.

7. The system of claim 5, wherein the one or more physical processors are further configured by computer-readable instructions such that the in-game virtual objects include countdown timers associated with expiration of timed in-game tasks.

8. The system of claim 1, wherein the one or more physical processors are further configured by computer-readable instructions to:
   determine one or more awards to associate with the expirations of the reengagement time periods, the determination based on log-in histories of the users, the first award determined for the first user account based on the first user account conveying a first frequency of log-in to the first user account.

9. The system of claim 8, wherein the one or more physical processors are further configured by computer-readable instructions such that determining one or more awards comprises determining awards within a first value range for user accounts that convey a frequency of log-in that is above a first threshold level, and determining awards within a second value range for user accounts that convey a frequency of log-in that is below the first threshold level.

10. The system of claim 9, wherein the one or more physical processors are further configured by computer-readable instructions such that the first value range is lower than the second value range.

11. A method of incentivizing user log-in to a user account associated with an online game, the method being implemented in a computer system including one or more physical processors and storage media storing machine-readable instructions, the method comprising:

managing user accounts associated with the users of the online game, the user accounts reflecting log-in histories of the user accounts, including managing a first user account associated with a first user;

executing an instance of the online game and implementing the instance of the online game to facilitate user participation in the online game that takes place in a virtual space;

determining reengagement time periods for individual ones of the user accounts, the reengagement time periods being determined to expire at times at which the users are expected to be logged out, wherein when the users are expected to be logged out of the individual ones of the users accounts is determined based on scheduled in-game events, such that a first reengagement time period is determined for the first user account based on when the first user is expected to be logged out of the first user account, wherein when the first user is expected to be logged out of the first user account is determined based on one or more of the scheduled in-game events;

associating one or more awards with expirations of the reengagement time periods, including associating a first award with an expiration of the first reengagement time period; and providing the one or more awards to the user accounts based on the expiration of the reengagement time periods and the user accounts conveying satisfaction of award redemption criteria, including providing the first award to the first user account based on the expiration of the first reengagement time period and a determination that the first user account conveys satisfaction of first redemption criteria.

12. The method of claim 11, wherein the reengagement time periods are determined to expire during the one or more in-game events and before the expirations of the one or more in-game events, the first reengagement time period is determined to expire during the first wait period and before an expiration of the first wait period.

13. The method of claim 11, further comprising determining, from a first log-in history reflected by the first user account, one or more times that the first user is not logged into the first user account, and wherein the reengagement time periods are determined to expire during at least one of the determined times.

14. The method of claim 11, wherein the first redemption criteria corresponds to logging in to the online game, such that the determination that the first user account conveys satisfaction of the first redemption criteria is based on the first user account conveying that the first user is logged in to the online game.

15. The method of claim 11, wherein the first redemption criteria corresponds to user entry and/or selection of in-game virtual objects after the expiration of the reengagement time periods, such that the determination that the first user account conveys satisfaction of the first redemption criteria is based on the first user account conveying that the first user entered and/or selected a first in-game virtual object after the expiration of the first reengagement time period.

16. The method of claim 15, wherein the entry and/or selection of in-game virtual objects is facilitated by touch-responsive displays of computing platforms associated with the user accounts and used to present the instance of the online game including the in-game virtual objects.

17. The method of claim 15, wherein the in-game virtual objects include countdown timers associated with expiration of timed in-game tasks.

18. The method of claim 11, further comprising:
determining one or more awards to associate with the expirations of the reengagement time periods, the determination based on log-in histories of the users, including determining the first award for the first user account based on the first user account conveying a first frequency of log-in to the first user account.

19. The method of claim 18, wherein determining one or more awards comprises determining awards within a first value range for user accounts that convey a frequency of log-in that is above a first threshold level, and determining awards within a second value range for user accounts that convey a frequency of log-in that is below the first threshold level.

20. The method of claim 19, wherein the first value range is lower than the second value range.

* * * * *